US012770478B2

(12) United States Patent
Kim et al.

(10) Patent No.: US 12,770,478 B2
(45) Date of Patent: Oct. 20, 2026

(54) INFORMATION PROCESSING SYSTEM, INFORMATION PROCESSING DEVICE, AND INFORMATION PROCESSING METHOD

(71) Applicant: KYOCERA Corporation, Kyoto (JP)

(72) Inventors: Jaechul Kim, Yokohama (JP); Kensuke Taguchi, Kawasaki (JP); Xiaoyan Dai, Yokohama (JP)

(73) Assignee: KYOCERA Corporation, Kyoto (JP)

(*) Notice: Subject to any disclaimer, the term of this patent is extended or adjusted under 35 U.S.C. 154(b) by 385 days.

(21) Appl. No.: 18/002,249

(22) PCT Filed: Jun. 2, 2021

(86) PCT No.: PCT/JP2021/021093

§ 371 (c)(1),
(2) Date: Dec. 16, 2022

(87) PCT Pub. No.: WO2021/256268

PCT Pub. Date: Dec. 23, 2021

(65) Prior Publication Data

US 2023/0177931 A1 Jun. 8, 2023

(30) Foreign Application Priority Data

Jun. 18, 2020 (JP) ................................ 2020-105633

(51) Int. Cl.
*G06Q 20/20* (2012.01)
*G06T 7/73* (2017.01)
(Continued)

(52) U.S. Cl.
CPC ............ *G07G 1/01* (2013.01); *G06Q 20/208* (2013.01); *G06T 7/73* (2017.01); *G06V 20/64* (2022.01);
(Continued)

(58) Field of Classification Search
CPC ...... G07G 1/01; G07G 1/0036; G07G 1/0063; G07G 1/14; G06Q 20/208; G06T 7/73;
(Continued)

(56) References Cited

U.S. PATENT DOCUMENTS

| | | | |
|---|---|---|---|
| 9,990,619 | B2 | 6/2018 | Miyakoshi |
| 2015/0189188 | A1 | 7/2015 | Penov et al. |

(Continued)

FOREIGN PATENT DOCUMENTS

| | | | |
|---|---|---|---|
| JP | 2004-127013 | A | 4/2004 |
| JP | 2016-126578 | A | 7/2016 |

(Continued)

*Primary Examiner* — Fahd A Obeid
*Assistant Examiner* — Reva R Moore
(74) *Attorney, Agent, or Firm* — Studebaker Brackett PLLC

(57) ABSTRACT

An information processing system 10 includes an imager 14 and a controller. The imager 14 generates an image by performing image capturing. The controller estimates an object contained in the image based on the image. The controller is able to estimate an object and a category of the object by performing recognition processing on the image. The controller generates an instruction regarding the object based on the estimated category of the object when estimation of the object fails in the recognition processing.

9 Claims, 4 Drawing Sheets

(51) Int. Cl.
*G06V 20/64* (2022.01)
*G07G 1/00* (2006.01)
*G07G 1/01* (2006.01)

(52) U.S. Cl.
CPC .. *G07G 1/0036* (2013.01); *G06T 2207/20081* (2013.01)

(58) Field of Classification Search
CPC .......... G06T 2207/20081; G06V 20/64; G06V 10/82
See application file for complete search history.

(56) References Cited

U.S. PATENT DOCUMENTS

| | | | | |
|---|---|---|---|---|
| 2017/0163882 | A1* | 6/2017 | Piramuthu | G06Q 30/0643 |
| 2017/0193319 | A1* | 7/2017 | Yasunaga | G06K 7/10722 |
| 2019/0370593 | A1* | 12/2019 | Nakao | H04N 23/60 |
| 2023/0143661 | A1* | 5/2023 | Konemura | G06T 3/02 382/103 |

FOREIGN PATENT DOCUMENTS

| | | | |
|---|---|---|---|
| JP | 2017-084377 | A | 5/2017 |
| JP | 2018-097883 | A | 6/2018 |

* cited by examiner

INFORMATION PROCESSING SYSTEM, INFORMATION PROCESSING DEVICE, AND INFORMATION PROCESSING METHOD

CROSS-REFERENCE TO RELATED APPLICATIONS

This application claims priority of Japanese Patent Application No. 2020-105633 filed in Japan on Jun. 18, 2020 and the entire disclosure of this application is hereby incorporated by reference.

TECHNICAL FIELD

The present invention relates to an information processing system, an information processing device, and an information processing method.

BACKGROUND OF INVENTION

There is a demand to recognize what an object is based on a captured image. For example, a method in which a product captured by a camera is identified at a cash register terminal in a store by being compared with products that the store handles that have already been captured. In addition, a product identification device has been proposed that reports an object orientation that allows differences between multiple handled products to be discriminated between when there are multiple handled products that are very similar to a product captured by a camera (refer to Patent Literature 1).

CITATION LIST

Patent Literature

Patent Literature 1: Japanese Unexamined Patent Application Publication No. 2018-097883

SUMMARY

In order to solve the above-described problem, in a First Aspect, an information processing system includes an imager and a controller. The imager is configured to generate an image by performing image capturing. The controller is configured to estimate an object contained in the image based on the image. The controller is able to estimate an object and estimate a category of the object by performing recognition processing on the image. The controller generates an instruction regarding the object based on the estimated category of the object when estimation of the object fails in the recognition processing.

In a Second Aspect, an information processing device includes: an acquiring unit and a controller. The acquiring unit is configured to acquire an image from an imager. The controller is configured to estimate an object contained in the image based on the image. The controller is able to estimate an object inside the image and a category of the object by performing recognition processing on the image. The controller generates an instruction regarding the object based on the estimated category of the object when estimation of the object fails in the recognition processing.

In a Third Aspect, in an information processing method, an imager is made to generate an image by performing image capturing. In recognition processing capable of estimating an object inside the image and a category of the object, an instruction regarding the object is generated based on the estimated category of the object when estimation of the object fails.

DESCRIPTION OF EMBODIMENTS

Hereafter, an information processing system to which an embodiment of the present disclosure has been applied is described while referred to the drawings.

Figure 1:
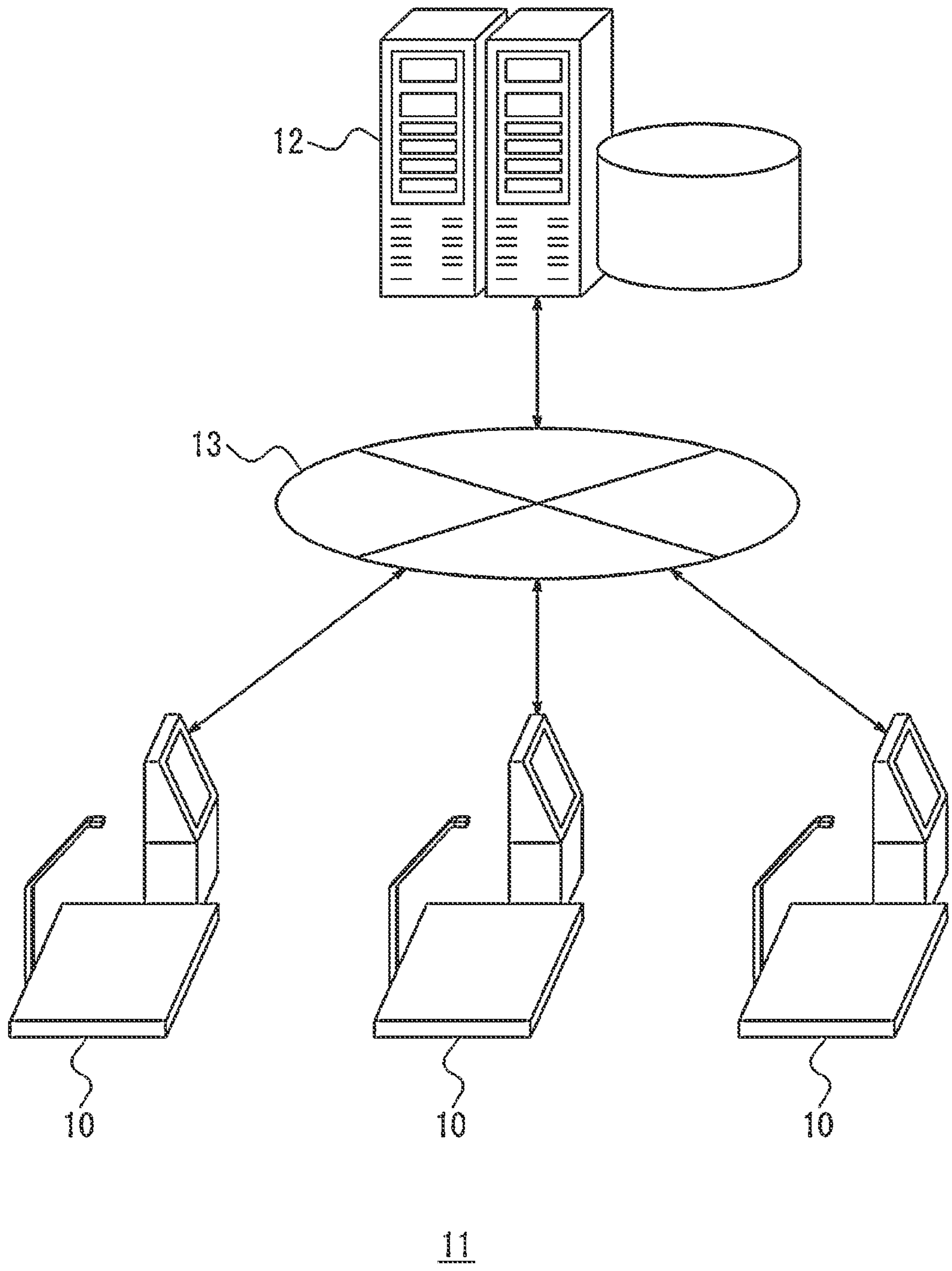
FIG. 1 is a configuration diagram illustrating the overall configuration of a payment system including an information processing system according to an embodiment.

As illustrated in FIG. 1, a payment system 11 includes an information processing system 10 according to an embodiment of the present disclosure. The payment system 11 includes at least one information processing system 10 and a server 12. In this embodiment, the payment system 11 includes a plurality of information processing systems 10.

In this embodiment, each information processing system 10 is included in a cash register terminal. The information processing system 10 captures an image of a product placed on the cash register terminal by the purchaser. The information processing system 10 performs object recognition on the captured image and estimates whether an object contained in the image is a product in the store. "An object in an image" means an object drawn inside the image. The information processing system 10 informs the server 12 of the estimation results of all the placed products via a network 13. The server 12 calculates the billed amount based on the estimation results. The server 12 informs the information processing system 10 of the billed amount. The information processing system 10 presents the billed amount to the purchaser and requests payment of the purchase amount.

Figure 2:
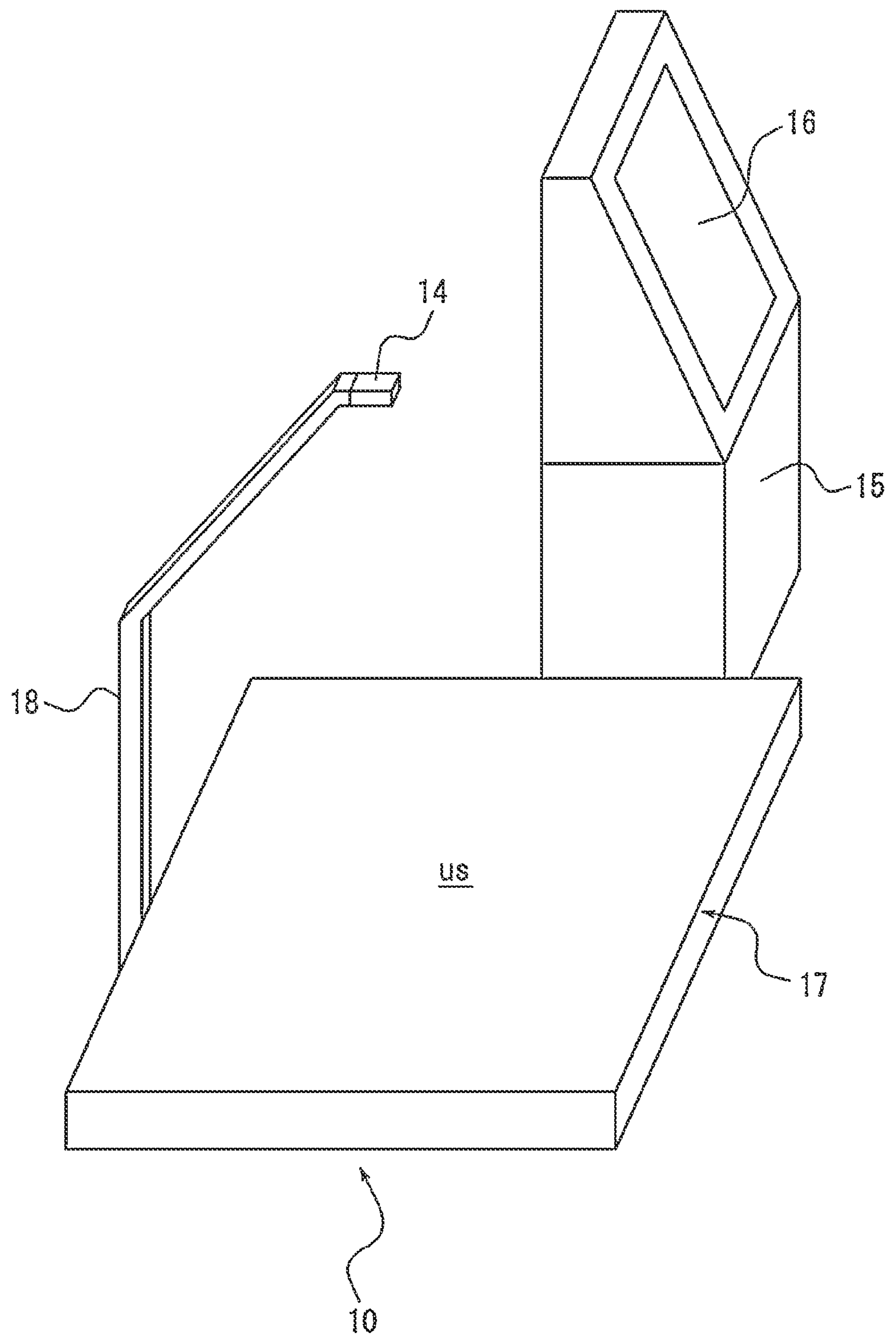
FIG. 2 is an external view illustrating the overall configuration of the information processing system in FIG. 1.

As illustrated in FIG. 2, the information processing system 10 includes an imager 14 and an information processing device 15. The information processing system 10 may further include a display device 16, a placement table 17, and a support column 18.

The imager 14 is fixed in place so as to be able to capture an image of the entire area of the placement table 17. The imager 14 is, for example, fixed to the support column 18, which extends from a side surface of the placement table 17. The imager 14 is, for example, fixed so as to be able to capture an image of the entirety of an top surface us of the placement table 17 and so that the optical axis is perpendicular to the top surface us. The imager 14 continually performs image capturing at a suitably chosen frame rate and generates an image signal.

The display device 16 is a suitably chosen known display. The display device 16 displays an image corresponding to the image signal sent from the information processing device 15. As described later, the display device 16 may also function as a touch screen.

Figure 3:
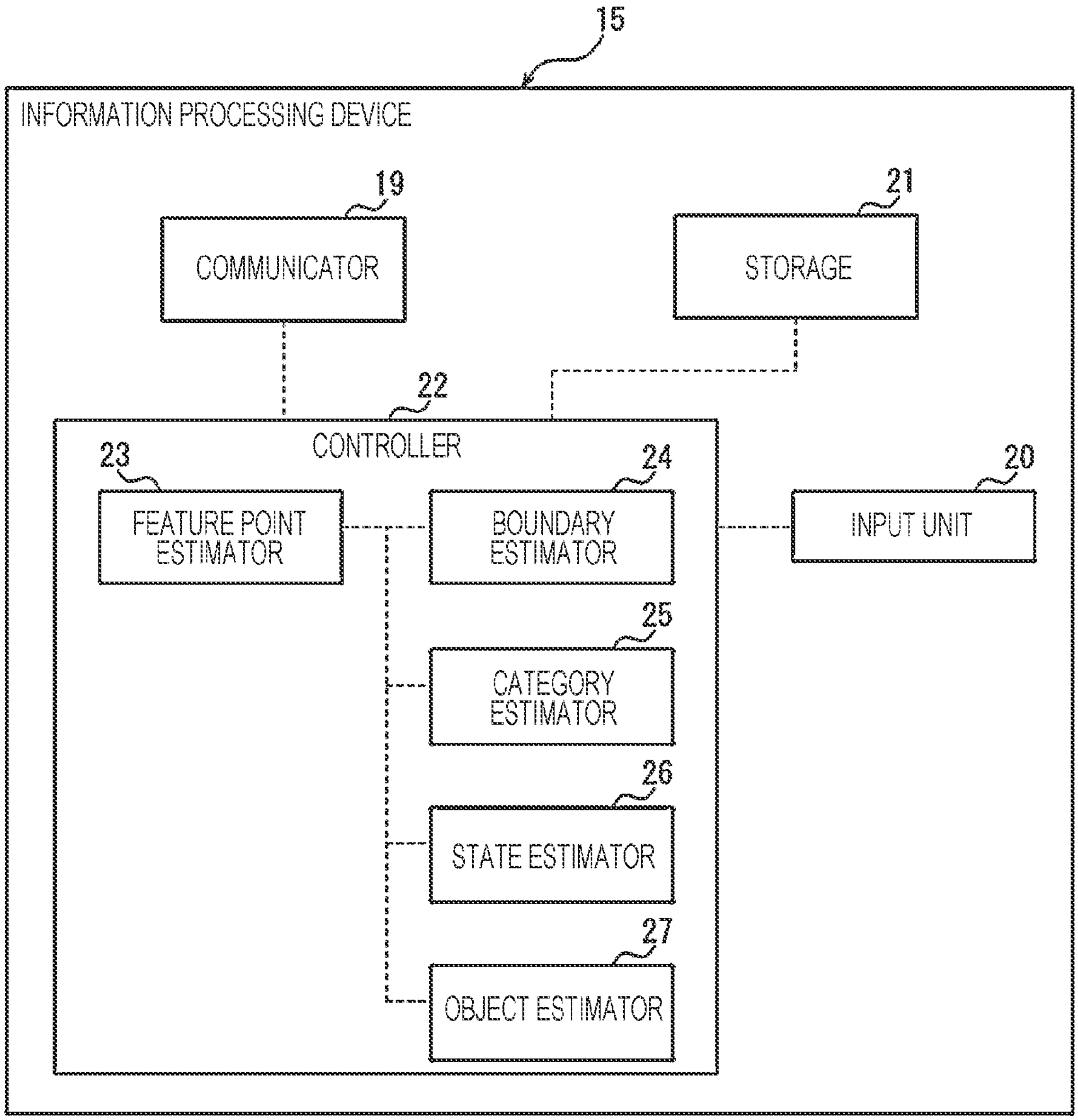
FIG. 3 is a functional block diagram illustrating the outline configuration of an information processing device in FIG. 2.

As illustrated in FIG. 3, the information processing device 15 includes a communicator 19 (acquiring unit), an input unit 20, a storage 21, and a controller 22. The information processing device 15 is configured as a separate device from the imager 14 and the display device 16 in this embodiment, but may instead be configured so as to be integrated with at least one out of the imager 14, the placement table 17, the support column 18, and the display device 16.

The communicator 19, for example, includes a communication module that communicates with the imager 14 via a communication line including a wired line or a wireless line. The communicator 19 receives, i.e., acquires an image from the imager 14 as a signal. The communicator 19 includes a communication module that communicates with the display device 16 via a communication line. The communicator 19 sends an image to be displayed to the display device 16 as an image signal. The communicator 19 may receive, from the display device 16, a position signal corresponding to a position at which contact is detected on a display surface of the display device 16. The communicator 19 includes a communication module that communicates with the server 12 via the network 13. The communicator 19 sends, to the server 12, results information corresponding to confirmed recognition results, as described later. The communicator 19 may receive bill information corresponding to the billed amount from the server 12.

The input unit 20 includes at least one interface that detects user input. The input unit 20 may include, for example, physical keys, capacitive keys, and a touch screen integrated with display device 16. In this embodiment, the input unit 20 is a touch screen.

The storage 21 includes any suitable storage device such as a random access memory (RAM) and a read only memory (ROM). The storage 21 stores various programs that allow the controller 22 to function and a variety of information used by the controller 22.

The controller 22 includes at least one processor and memory. Such processors may include general-purpose processors into which specific programs are loaded to perform specific functions, and dedicated processors dedicated to specific processing. Dedicated processors may include an application specific integrated circuit (ASIC). Processors may include programmable logic devices (PLDs). PLDs may include field-programmable gate arrays (FPGAs). The controller 22 may be either a system-on-a-chip (SoC) or a system in a package (SiP), in which one or more processors work together.

The controller 22 performs estimation on objects contained in an image. Object estimation performed by the controller 22 will be described in detail hereafter. The controller 22 can estimate each object contained in an image and the category of each object by performing recognition processing on an image acquired by the communicator 19. The controller 22 may be able to estimate the state of each object contained in the image and a bounding frame that surrounds a single object, such as a bounding box, through the recognition processing. Estimation of objects, categories, states, and bounding frames performed by the controller 22 will be described in detail hereafter.

The controller 22 estimates objects contained in an image by functioning as a feature point estimator 23, a boundary estimator 24, a category estimator 25, a state estimator 26, and an object estimator 27.

The feature point estimator 23 estimates feature points contained in an image based on the image.

The boundary estimator 24 estimates bounding frames surrounding the objects in the image based on the feature points estimated by the feature point estimator 23. When an image contains a plurality of objects, the boundary estimator 24 estimates a bounding frame for each object.

The category estimator 25 estimates the category of an object inside a bounding frame based on a feature point estimated by the feature point estimator 23. Therefore, when the image contains a plurality of objects, the category estimator 25 may estimate the category of the object in each bounding frame surrounding the corresponding object. The categories of objects are the types of objects including the packaging state such as noodles in cups, instant noodles in bags, beverages in PET bottles, beverages in paper cartons, canned goods, confectionery in bags, books, and so on.

The state estimator 26 estimates the state of an object inside a bounding frame based on the feature point estimated by the feature point estimator 23. Therefore, when the image contains a plurality of objects, the state estimator 26 may estimate the state of the object in each bounding frame surrounding the object. The state of the object is, for example, the orientation of the object in the image.

The object estimator 27 estimates an object inside a bounding frame based on a feature point estimated by the feature point estimator 23. Therefore, when the image contains a plurality of objects, the category estimator 25 may estimate the object in each bounding frame surrounding the object. Estimation of an object is, for example, estimation of the name of the handled product. As well as estimating the object, the object estimator 27 calculates the reliability of the estimation. When the reliability of the estimation is greater than or equal to a threshold, the estimation of the object is regarded as having been successful. When the reliability of the estimation is less than the threshold, the estimation of the object is regarded as having failed.

The feature point estimator 23, the boundary estimator 24, the category estimator 25, the state estimator 26, and the object estimator 27 consist of, for example, a multilayer-structure neural network. The feature point estimator 23, the boundary estimator 24, the category estimator 25, the state estimator 26, and the object estimator 27 are built using supervised learning. The feature point estimator 23 is built by training using images labeled with bounding frames, categories, states, and object names for individual objects.

In the above-described recognition processing, when the object estimator 27 has failed in the estimation of the object, the controller 22 generates an instruction regarding the object based on the category of the object estimated by the category estimator 25. Note that it is generally easier to estimate the categories of objects than the objects themselves. Therefore, even if estimation of an object fails, the category can be estimated with high confidence.

An instruction regarding an object may suggest changing the posture of the object to a specific orientation. In general, the best surface to use to estimate an object will vary depending on the category of the object. For example, when the object category is noodles in cups or books, the best surface to use to estimate the object is the top surface. For example, when the object category is beverages in PET bottles, beverages in paper cartons, or canned goods, the best surface to use to estimate the object is a side surface. For example, when the object category is confectionery in bags or instant noodles in bags, the best surface to use to estimate the object is the front surface. Therefore, when the object category is noodles in cups, the instruction regarding the object may be “please turn the top surface toward the camera” or “please turn the lid toward the camera” so as to specifically present the top surface of the noodles in a cup. When the object category is books, the instruction regarding the object may be “please turn the cover toward the camera so as to specifically present the top surface of the book. When the object category is beverages in PET bottles or the like, the instruction regarding the object may be, for example, “please turn the side surface toward the camera” or “please turn the label toward the camera” so as to specifically present the side surface of the PET bottle. When the object category is confectionery in bags or the like, the instruction regarding the object may be, for example, “please turn the front surface toward the camera”.

Generation of a instruction regarding an object by the controller 22 when the object estimator 27 has failed to estimate an object may also be based on the state of the object estimated by the state estimator 26. Note that it is generally easier to estimate the states of objects than the objects themselves. Therefore, even if estimation of an object fails, the state can be estimated with high confidence.

The instruction regarding the object may further suggest changing the posture of the object with reference to the orientation of the object orientation, which is the estimated state of the object. For example, when the estimated orientation of the object corresponds to the bottom surface side and the best surface to use to estimate the object is the top surface, the instruction regarding the object may suggest changing the posture from the bottom surface side, which is the estimated orientation, to the top surface side. More specifically, in this case, the instruction regarding the object may be “please turn the object over”. For example, when the estimated orientation of the object corresponds to the bottom surface side and the best surface to use to estimate the object is a side surface, the instruction regarding the object may suggest changing the posture from the bottom surface side, which is the estimated orientation, to a side surface side. More specifically, in this case, the instruction regarding the object may be “please turn the object onto its side”.

As described above, the instructions regarding objects are determined in advance for each category and each state and stored in the storage 21. The controller 22 may generate instructions regarding objects corresponding to the categories estimated by the category estimator 25 and the states estimated by the state estimator 26 by reading instructions from the storage 21.

The controller 22 controls the communicator 19 so as to send an instruction regarding an object to the display device 16. When multiple objects are contained in the image, the controller 22 may generate an instruction regarding the object so that the instruction is displayed in such a manner that the object to which the instruction refers can be identified. For example, the controller 22 may generate an instruction regarding the object so that the instruction is displayed close to the bounding frame surrounding the object for which estimation has failed in the image subjected to the recognition processing.

When the object estimator 27 is successful in estimating the object, the controller 22 controls the communicator 19 to send information indicating the estimated object to the server 12. When the controller 22 receives information indicating the billed amount from the server 12 in response to sending the information indicating the estimated object, the controller 22 presents the billed amount to the user. The controller 22, for example, may create an image requesting payment of the billed amount and present the image to the user by causing the display device 16 to display the image.

The server 12, for example, consists of a physical server or a cloud server. The server 12 identifies an object placed on the placement table 17 of the information processing system 10 based on information indicating the estimated object sent from the information processing system 10. The server 12 calculates the billed amount for the user of the information processing system 10 by reading out the price of the object from a database. The server 12 sends information indicating the billed amount to the information processing system 10.

The server 12 may include data for building the feature point estimator 23, the boundary estimator 24, the category estimator 25, the state estimator 26, and the object estimator 27, which are each updated, and the server 12 may send the data to the information processing system 10.

Figure 4:
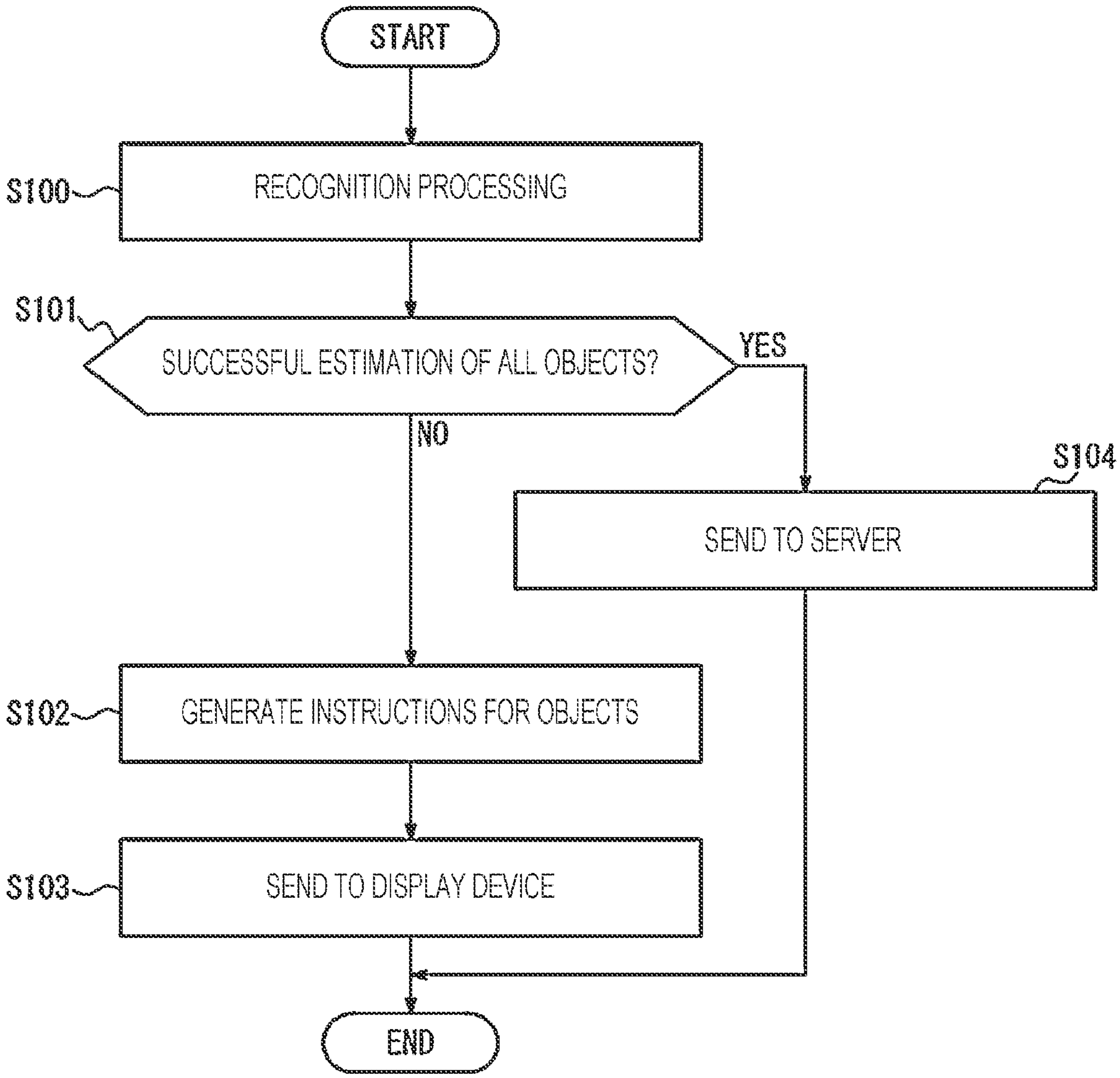
FIG. 4 is a flowchart for describing object estimation processing executed by a controller in FIG. 3.

Next, object estimation processing executed by the controller 22 in this embodiment will be described using the flowchart in FIG. 4. The object estimation processing starts each time an image of one frame is received from the imager 14.

In Step S100, the controller 22 performs recognition processing on the received image. After execution of the recognition processing, the process advances to Step S101.

In Step S101, the controller 22 determines whether all of the objects surrounded by bounding frames have been successfully estimated or not. When the objects have been successfully estimated, the process advances to Step S102. When estimation of the objects fails and is not successful, the process advances to Step S103.

In Step S102, for each object for which it was determined estimation failed in Step S101, the controller 22 generates an instruction regarding the object corresponding to the estimated category and state. After that, the process advances to Step S103.

In Step S103, the controller 22 controls the communicator 19 to send the instructions regarding the objects generated in Step S102 to the display device 16. After that, the object estimation processing ends.

In Step S104, the controller 22 controls the communicator 19 to send information indicating all the objects successfully estimated by the recognition processing of Step S100 to the server 12. After that, the object estimation processing ends.

The thus-configured information processing system 10 of this embodiment generates instructions regarding objects based on the estimated categories of the objects when the estimation of the objects failed in the recognition processing performed on the image. With this configuration, the information processing system 10 can make the user aware of instructions regarding the objects that will facilitate the estimation of the objects based on categories, which are easier to estimate than the objects themselves. Therefore, the information processing system 10 is able to generate an appropriate instruction regarding an object even when an object cannot be estimated with high confidence.

The information processing system 10 of this embodiment is also able to estimate the states of objects via the recognition processing and also generates instructions regarding objects based on the estimated states of the objects when the estimation of objects fails. With this configuration, the information processing system 10 can generate instructions regarding what to do from the states of the objects in the captured image. Therefore, the information processing system 10 can generate instructions that the user can easily understand.

The information processing system 10 of this embodiment is also able to estimate objects and categories for each of a plurality of objects contained in an image. With this configuration, even when estimation fails for some objects out of a plurality of objects contained in an image, the information processing system 10 is able to generate instructions regarding objects for some of the objects.

In the information processing system 10 of this embodiment, the controller 22 functions as the feature point estimator 23 that estimates feature points based on an image, the boundary estimator 24 that estimates bounding frames surrounding objects based on feature points, the category estimator 25 that estimates categories of objects based on feature points, the state estimator 26 that estimates states of objects based on feature points, and the object estimator 27 that estimates objects based on feature points. With this configuration, in the information processing system 10, the configuration of the neural network is simpler and easier to maintain and manage than a configuration in which objects are estimated based on images.

The present invention has been described based on the drawings and examples, but it should be noted that a variety of variations and amendments may be easily made by one skilled in the art based on the present disclosure. Therefore, it should be noted that such variations and amendments are included within the scope of the present invention.

REFERENCE SIGNS

10 information processing system
11 payment system
12 server
13 network
14 imager
15 information processing device
16 display device
17 placement table
18 support column
19 communicator
20 input unit
21 storage
22 controller
23 feature point estimator
24 boundary estimator
25 category estimator
26 state estimator
27 object estimator
us top surface

The invention claimed is:

1. An information processing system comprising:
an imager configured to generate an image;
a controller using supervised learning is configured to estimate information indicating an object contained in the image, a category and an orientation of the object based on the image, wherein the controller is trained using images labeled with bounding frames, categories, states, and object names for individual objects; and
a display device configured to display the image and the information indicating the object,
wherein the controller includes a multilayer-structure neural network that is configured to:
estimate a feature point of the image generated by the imager based on the image;
estimate a bounding frame of the object contained in the image based on the estimated feature point;
estimate a category of the object inside the bounding frame based on the estimated feature point;
estimate a state of the object inside the bounding frame based on the estimated feature point; and
estimate the object inside the bounding frame based on the estimated feature point, and
the controller is configured to
determine that the controller fails to estimate the information indicating the object for any of the objects within their bounding frame when a calculated reliability of the estimated information is less than a threshold, and
when the controller fails to estimate the information for the object and succeeds in estimating the category of the object and the orientation of the object, the controller controls the display device to display an instruction to change a posture of the object to a specific orientation relative to the imager based on the estimated category of the object and the originally estimated orientation of the object.

2. The information processing system according to claim 1,
wherein the controller is further configured to
estimate the state of the object through recognition processing; and
generate an instruction regarding the object based on the state when the controller fails to estimate of the object in a recognition processing.

3. The information processing system according to claim 2,
wherein the state of the object includes an orientation of the object in the image.

4. The information processing system according to claim 3,
wherein the instruction regarding the object indicates changing a posture of the object with reference to the estimated orientation of the object.

5. The information processing system according to claim 1,
wherein the instruction regarding the object indicates changing a posture of the object to a specific orientation corresponding to the category.

6. The information processing system according to claim 1,
wherein the controller is configured to estimate the object and the category for each of a plurality of objects contained in the image through recognition processing on the image.

7. The information processing system according to claim 1,
wherein the controller is further configured to be trained, for an image generated by the imager, based on a bounding frame surrounding an object contained in the image, a category of the object, a state of the object, and a name of the object.

8. An information processing device comprising:
an acquiring unit configured to acquire an image;
a controller using supervised learning is configured to estimate information indicating an object contained in the image, a category and an orientation of the object based on the image, wherein the controller is trained using images labeled with bounding frames, categories, states, and object names for individual objects; and
a display device configured to display the image and the information indicating the object,
wherein the controller includes a multilayer-structure neural network that is configured to:
estimate a feature point of the image generated by the imager based on the image;
estimate a bounding frame of the object contained in the image based on the estimated feature point;
estimate a category of the object inside the bounding frame based on the estimated feature point;
estimate a state of the object inside the bounding frame based on the estimated feature point; and
estimate the object inside the bounding frame based on the estimated feature point, and
the controller is configured to determine that the controller fails to estimate the information indicating the object for any of the objects within their bounding frame when a calculated reliability of the estimated information is less than a threshold, and when the controller fails to estimate the information for the object and succeeds in estimating the category of the object and the orientation of the object, the controller controls the display device to display an instruction to change a posture of the object to a specific orientation relative to the imager based on the estimated category of the object and the originally estimated orientation of the object.

9. An information processing method, wherein an imager is made to generate an image by performing image capturing; and in recognition processing, using a controller using supervised learning in a multilayer-structure neural network to estimate information indicating an object contained in the image, a category and an orientation of the object based on the image, wherein the controller is trained using images labeled with bounding frames, categories, states, and object names for individual objects, for estimating information indicating the object inside the image, a category and an orientation of the object based on the image, estimating a feature point of the image generated by the imager based on the image;

estimating a bounding frame of the object contained in the image based on the estimated feature point;

estimating a category of the object inside the bounding frame based on the estimated feature point;

estimating a state of the object inside the bounding frame based on the estimated feature point; and estimating the object inside the bounding frame based on the estimated feature point, determine that the information estimating fails to estimate the information indicating the object for any of the objects within their bounding frame when a calculated reliability of the estimated information is less than a threshold, and when the information estimating fails to estimate the information for the object, and the category estimating succeeds in estimating the category of the object and the orientation estimating succeeds in estimating the orientation of the object, controlling a display device, which is configured to display the image and the information indicating the at least one object, to display an instruction to change a posture of the object to a specific orientation relative to the imager based on the estimated category of the object and the originally estimated orientation of the object.

* * * * *